(12) United States Patent
Park et al.

(10) Patent No.: US 8,816,996 B2
(45) Date of Patent: Aug. 26, 2014

(54) BARRIER PANEL DEVICE FOR 3D IMAGE REPRODUCTION, AND METHOD OF DRIVING SAME

(75) Inventors: Sang-moo Park, Uijeongbu-si (KR); Serguei Chestak, Suwon-si (KR); Dae-sik Kim, Suwon-si (KR); Kyung-hoon Cha, Yongin-si (KR); Seon-deok Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1198 days.

(21) Appl. No.: 12/490,532

(22) Filed: Jun. 24, 2009

(65) Prior Publication Data

US 2010/0039573 A1    Feb. 18, 2010

(30) Foreign Application Priority Data

Aug. 18, 2008  (KR) .................. 10-2008-0080566

(51) Int. Cl.
  *G06F 3/038*   (2013.01)
  *G09G 5/00*    (2006.01)
  *G09G 3/00*    (2006.01)
  *G09G 3/36*    (2006.01)
  *G02B 27/22*   (2006.01)
  *H04N 13/04*   (2006.01)

(52) U.S. Cl.
  CPC ........ *G02B 27/2214* (2013.01); *H04N 13/0497* (2013.01); *H04N 13/0413* (2013.01); *G09G 3/36* (2013.01)
  USPC .................. 345/204; 345/32; 345/87; 345/90

(58) Field of Classification Search
  CPC ............... G09G 3/36–3/3696; G02B 27/2214; H04N 13/04–13/0413
  USPC ........ 345/1.1–9, 204–215, 690–699, 87–104, 345/55–72
  See application file for complete search history.

(56) References Cited

U.S. PATENT DOCUMENTS

| 6,094,216 A | 7/2000 | Taniguchi et al. |
| 7,733,296 B2 * | 6/2010 | Lee et al. ........................ 345/6 |

(Continued)

FOREIGN PATENT DOCUMENTS

| JP | 58184928 A | 10/1983 |
| JP | 921979 A | 1/1997 |

(Continued)

OTHER PUBLICATIONS

Communication dated Jun. 18, 2013, issued by the Mexican Institute of Industrial Property in counterpart Mexican Patent Application No. MX/A/2011/001628.

(Continued)

*Primary Examiner* — Alexander Eisen
*Assistant Examiner* — Patrick F Marinelli
(74) *Attorney, Agent, or Firm* — Sughrue Mion, PLLC

(57) ABSTRACT

Provide is a method of driving a barrier panel device. Segment driving voltages are controlled to be applied to a plurality of segments of a first electrode of a barrier panel based on a display direction of an image signal displayed on an image display panel of an apparatus for reproducing a 3D image. An odd barrier driving voltage is controlled to be commonly applied to odd numbered barriers of a plurality of barriers of a second electrode of the barrier panel. An even barrier driving voltage is controlled to be commonly applied to even numbered barriers of the plurality of barriers. The segment driving voltage, the odd barrier driving voltages, and the even barrier driving voltages are synchronized.

20 Claims, 8 Drawing Sheets

(56) References Cited

U.S. PATENT DOCUMENTS

| | | | |
|---|---|---|---|
| 8,040,307 B2 * | 10/2011 | Kim et al. | 345/87 |
| 8,044,881 B2 * | 10/2011 | Nam et al. | 345/32 |
| 8,059,063 B2 * | 11/2011 | Nam et al. | 345/6 |
| 8,174,464 B2 * | 5/2012 | Choi et al. | 345/6 |
| 2006/0126177 A1 | 6/2006 | Kim et al. | |
| 2006/0197725 A1 * | 9/2006 | Nam et al. | 345/87 |
| 2007/0091058 A1 * | 4/2007 | Nam et al. | 345/102 |
| 2007/0103547 A1 * | 5/2007 | Kim et al. | 348/55 |
| 2008/0204368 A1 * | 8/2008 | Han et al. | 345/55 |
| 2008/0218459 A1 | 9/2008 | Kim et al. | |

FOREIGN PATENT DOCUMENTS

| | | |
|---|---|---|
| JP | 974574 A | 3/1997 |
| JP | 3038314 U | 3/1997 |
| JP | 9138370 A | 5/1997 |
| KR | 10-2006-0096844 A | 9/2006 |
| KR | 10-2006-0097175 A | 9/2006 |
| KR | 10-0831017 B1 | 5/2008 |
| KR | 10-2008-0056592 A | 6/2008 |
| KR | 10-0846707 B1 | 7/2008 |
| WO | 2008044858 A1 | 4/2008 |

OTHER PUBLICATIONS

Communication dated Aug. 6, 2013, issued by the Japanese Patent Office in counterpart Japanese Patent Application No. 2011-523730.
Communication, dated Nov. 26, 2012, issued by the State Intellectual Property Office of the P.R. China in counterpart Chinese Application No. 200980141107.5.
Communication, dated Apr. 22, 2014, issued by the Japanese Patent Office in counterpart Japanese Patent Application No. 2011-523730.
Communication, dated Jun. 17, 2014, issued by the Korean Intellectual Property Office in counterpart Korean Patent Application No. 10-2008-0080566.

* cited by examiner

BARRIER PANEL DEVICE FOR 3D IMAGE REPRODUCTION, AND METHOD OF DRIVING SAME

CROSS-REFERENCE TO RELATED PATENT APPLICATION

This application claims priority from Korean Patent Application No. 10-2008-0080566, filed Aug. 18, 2008, in the Korean Intellectual Property Office, the disclosure of which is incorporated herein in its entirety by reference.

BACKGROUND OF THE INVENTION

1. Field of the Invention

The invention relates to a three-dimensional (3D) image reproduction.

2. Description of the Related Art

In stereoscopy, the illusion of depth in a three-dimensional (3D) image is achieved via binocular parallax. That is, the apparent difference in the position of an object as seen separately by the human eyes placed at a distance of approximately 65 mm from each other. When two two-dimensional (2D) images of the same object seen by the eyes of a person are transferred to the brain via the retina, the brain merges the 2D images and uses the differences between the images to reconstruct the third dimension (i.e., depth) and obtain a 3D image. Such a phenomenon is called stereography.

Methods of displaying a 3D image include methods requiring special glasses, requiring no special glasses, holographic displaying, etc.

Methods of displaying a 3D image that require no special glasses may be classified into parallax barrier methods, in which images are separated and observed via apertures having a longitudinal lattice shape for each image corresponding to the left and right eyes, and lenticular methods, in which a lenticular plate on which semi-cylindrical lenses are arranged is used.

An apparatus for reproducing a 3D image using the parallax barrier method generates a 3D image by separately displaying stereo images for the left and right eyes. In the parallax barrier method, a user perceives a 3D image by providing a sufficient parallax effect by overlapping longitudinal or latitudinal openings having slit shapes on a flat image for displaying image information for the right and left eyes.

SUMMARY OF THE INVENTION

According to an exemplary aspect of the invention, there is provided a barrier panel device for 3D image reproduction, the barrier panel device including: a barrier panel, which includes a first electrode including a plurality of segments parallel to each other, a second electrode including a plurality of barriers parallel to each other and perpendicular to the plurality of segments, and a liquid crystal disposed between the first and second electrodes; a segment driving voltage controller, which controls driving voltages applied to the plurality of segments of the first electrode; and a barrier driving voltage controller, which controls driving voltages applied to the plurality of barriers of the second electrode.

The barrier driving voltage controller may control an odd barrier driving voltage, which is commonly applied to odd number barriers, and an even barrier driving voltage, which is commonly applied to even number barriers, and control on/off states of the odd and even barrier driving voltages to be periodically repeated while alternating with each other.

The segment driving voltage controller may control each segment driving voltage to be periodically applied to a corresponding segment, and control a time of changing on/off states of a segment driving voltage of a predetermined segment to be sequentially delayed from a time of changing on/off states of a segment driving voltage of a neighboring segment.

The barrier driving voltage controller may control the odd and even barrier driving voltages so that the odd barrier driving voltage is in an on state and the even barrier driving voltage is in an off state during a first half cycle of the odd and even barrier driving voltages, and the odd barrier driving voltage may be in an off state and the even barrier driving voltage is in an on state during a second half cycle of the odd and even barrier driving voltages, wherein the on state indicates a predetermined anode voltage value and the off state indicates a voltage value of 0V.

The barrier driving voltage controller may control one cycle of the odd and even barrier driving voltages to be equal to the quadruple of a cycle of a vertical synchronization signal, and synchronize the odd and even barrier driving voltages based on a point of time that of the vertical synchronization signal is generated.

The barrier driving voltage controller may control the odd and even barrier driving voltages so that the on/off states are repeated in a high frequency by applying the odd and even barrier driving voltages in a pulse form, wherein the on state indicates a predetermined anode voltage value and the off state indicates a predetermined cathode voltage value.

The segment driving voltage controller may control each segment driving voltage so that the on/off states of the each segment driving voltage have opposite waveforms during the first half cycle and during the second half cycle, and control the segment driving voltage applied on the plurality of the segments so that times of changing on/off states of the segment driving voltage are sequentially delayed by a predetermined delay time from a time of changing on/off states of the segment driving voltage applied to a first segment during a quadrant cycle of the segment driving voltage, wherein the on state indicates a predetermined anode voltage value and the off state indicates a voltage value of 0V.

The segment driving voltage controller may determine a predetermined delay time of a predetermined segment to be proportional to a time of displaying an actual image for the 3D image reproduction and a sequence number of the predetermined segment.

The segment driving voltage controller may control one cycle of the segment driving voltage to be equal to the quadruple of a cycle of a vertical synchronization signal, and synchronize each segment driving voltage based on a point of time that the vertical synchronization signal is generated.

The segment driving voltage controller may control the on/off states of the segment driving voltage to be repeated in a high frequency by applying the segment driving voltage in an pulse form, and control the segment driving voltage so that times of applying a predetermined segment driving voltage in an on state once to each segment are sequentially shifted by a predetermined delay time during a half cycle of the segment driving voltage, wherein the on state indicates a predetermined anode voltage value and the off state indicates a predetermined cathode voltage value.

The segment driving voltage controller may control one cycle of the segment driving voltage to be equal to twice the cycle of a vertical synchronization signal, and synchronize each segment driving voltage based on a point of time that the vertical synchronization signal is generated.

The odd barrier driving voltage that is commonly applied to the odd number barriers, the even barrier driving voltage that is commonly applied to the even number barriers, and the segment driving voltages applied to each segment may be synchronized based on a point of time of a vertical synchronization signal, and the barrier panel device may further include a barrier panel controller, which controls on/off states based on each of an absolute value of an odd barrier switching driving voltage as a difference voltage between the odd barrier driving voltage and the segment driving voltage, and an absolute value of an even barrier switching driving voltage as a difference voltage between the even barrier driving voltage and the segment driving voltage for each segment to be maintained for one cycle of the vertical synchronization signal while alternating with each other per cycle of the vertical synchronization signal.

According to another exemplary aspect of the invention, there is provided a method of driving a barrier panel device for reproducing a 3D image, the method including: controlling segment driving voltages each being applied to a plurality of segments of a first electrode of the barrier panel, based on a display direction and a cycle of an image signal being displayed on an image display panel for reproducing a 3D image; controlling an odd barrier driving voltage, which is commonly applied to an odd number barriers, and an even barrier driving voltage, which is commonly applied to an even number barriers, from among a plurality of barriers of a second electrode of the barrier panel, based on the display direction; and synchronizing the segment driving voltages, the odd barrier driving voltage, and the even barrier driving voltage, wherein the barrier panel may include the first electrode that includes a plurality of segments parallel to each other, the second electrode that includes a plurality of barriers parallel to each other and perpendicular to the plurality of segments, and a liquid crystal disposed between the first and second electrodes.

The controlling of the odd and even barrier driving voltages may include controlling the odd and even barrier driving voltages in such a way that on/off states of the odd and even barrier driving voltages are periodically repeated while alternating with each other.

The controlling of the odd and even barrier driving voltages may further include: maintaining the odd barrier driving voltage in an on state and the even barrier driving voltage in an off state during a first half cycle from among one cycle of the odd and even barrier driving voltages; and maintaining the odd barrier driving voltage in an off state and the even barrier driving voltage in an on state during a second half cycle from among one cycle of the odd and even barrier driving voltages, wherein the on state indicates a predetermined anode voltage value and the off state indicates a voltage value of 0V.

The controlling of the odd and even barrier driving voltages may further include: controlling one cycle of the odd and even barrier driving voltages to be the quadruple of a cycle of a vertical synchronization signal; and synchronizing the odd and even barrier driving voltages based on a time of the vertical synchronization signal.

The controlling of the odd and even barrier driving voltages may include controlling on/off states of the odd and even barrier driving voltages to repeat while alternating with each other in a high frequency based on a time of a vertical synchronization signal, by applying the odd and even barrier driving voltages in an impulse form, wherein the on state indicates a predetermined anode voltage value and the off state indicates a predetermined cathode voltage value.

The controlling of the segment driving voltages may include: controlling each segment driving voltage to be periodically applied; and controlling the segment driving voltages so that times of changing on/off states of a segment driving voltage of a predetermined segment are sequentially delayed from a time of changing on/off states of a segment driving voltage of a neighboring segment.

The controlling of each segment driving voltage to be periodically applied may include controlling on/off states of a segment driving voltage applied to a predetermined segment to be opposite during a first half cycle and a second half cycle, from one cycle of the segment driving voltage, and the controlling of the segment driving voltages so that times of changing on/off states of a segment driving voltage of a predetermined segment are sequentially delayed from a time of changing on/off states of a segment driving voltage of a neighboring segment includes controlling the segment driving voltage applied on the plurality of the segments in such a way that times of changing on/off states of the segment driving voltage are sequentially delayed by a predetermined delay time from a time of changing on/off states of the segment driving voltage applied to a first segment during a quadrant cycle of the segment driving voltage, wherein the on state indicates a predetermined anode voltage value and the off state indicates a voltage value of 0V.

The controlling of each segment driving voltage to be periodically applied may include controlling one cycle of the segment driving voltage to be equal to the quadruple of a vertical synchronization signal, and the controlling of the segment driving voltages so that times of changing on/off states of a segment driving voltage of a predetermined segment are sequentially delayed from a time of changing on/off states of a segment driving voltage of a neighboring segment includes synchronizing each segment driving voltage based on a time of the vertical synchronization signal.

The controlling of each segment driving voltage to be periodically applied may include controlling on/off states of the segment driving voltage to be repeated in a high frequency by applying the segment driving voltage in an impulse form, and the controlling of the segment driving voltages so that times of changing on/off states of a segment driving voltage of a predetermined segment are sequentially delayed from a time of changing on/off states of a segment driving voltage of a neighboring segment includes controlling the segment driving voltage in such a way that times of applying a predetermined segment driving voltage in an on state once to each segment are sequentially shifted by a predetermined delay time during one cycle of the segment driving voltage, wherein the on state indicates a predetermined anode voltage value and the off state indicates a predetermined cathode voltage value.

The controlling of each segment driving voltage to be periodically applied may further include controlling one cycle of the segment driving voltage to be equal to twice a cycle of a vertical synchronization signal, and the controlling of the segment driving voltages so that times of changing on/off states of a segment driving voltage of a predetermined segment are sequentially delayed from a time of changing on/off states of a segment driving voltage of a neighboring segment includes synchronizing the each segment driving voltage based on a time of the vertical synchronization signal.

The synchronizing of the segment driving voltages may include synchronizing the odd barrier driving voltage commonly applied to the odd number barriers, the even barrier driving voltage commonly applied to the even number barriers, and the segment driving voltages applied to each segment based on a time of a vertical synchronization signal, and the method may further include controlling on/off states of each based on an absolute value of an odd barrier switching driving voltage as a difference voltage between the odd barrier driving voltage and the segment driving voltage, and an absolute value of an even barrier switching driving voltage as a difference voltage between the even barrier driving voltage and the segment driving voltage for each segment to be maintained for one cycle of the vertical synchronization signal while alternating with each other per cycle of the vertical synchronization signal.

According to another exemplary aspect of the invention, there is provided an apparatus for reproducing a 3D image, the apparatus including: a light source; an image display panel displaying an image signal; a barrier panel including a first electrode which includes a plurality of segments parallel to each other, a second electrode which includes a plurality of barriers parallel to each other and perpendicular to the plurality of segments, and a liquid crystal which is disposed between the first and second electrodes; and a switching driving voltage controller controlling driving voltages applied to the first and second electrodes based on a display direction and a cycle of the image signal displayed on the image display panel.

The switching driving voltage controller may control the on/off states based on each of an absolute value of an odd barrier switching driving voltage as a difference voltage between an odd barrier driving voltage commonly applied to odd number barriers of the plurality of barriers and a segment driving voltage applied to the plurality of segments, and an absolute value of an even barrier switching driving voltage as a difference voltage between an even barrier driving voltage commonly applied to even number barriers of the plurality of barriers and the segment driving voltage to be maintained for one cycle of a vertical synchronization signal while alternating with each other per cycle of the vertical synchronization signal.

The switching driving voltage controller may synchronize the odd barrier driving voltage, the even barrier driving voltage, and the segment driving voltage based on a point of time that the vertical synchronization signal is generated, and control on/off states of the odd and even barrier switching driving voltages to be each maintained for one cycle of the vertical synchronization signal.

The switching driving voltage controller may include: a second electrode driving voltage controller, which controls on/off states of the odd and even barrier driving voltages to be periodically repeated while alternating with each other; and a first electrode driving voltage controller, which controls the segment driving voltage to be periodically repeated and controls times of changing on/off states of a segment driving voltage of a predetermined segment to be sequentially delayed from a time of changing on/off states of a segment driving voltage of a neighboring segment.

The second electrode driving voltage controller may control the odd and even barrier driving voltages so that the odd barrier driving voltage is in an on state and the even barrier driving voltage is in an off state during a first half cycle of one cycle of the odd and even barrier driving voltages, and the odd barrier driving voltage is in an off state and the even barrier driving voltage is in an on state during a second half cycle of the one cycle, and the first electrode driving voltage controller may control on/off states of a segment driving voltage applied to a predetermined segment to be opposite during a first half cycle and a second half cycle of one cycle of the segment driving voltage and control the segment driving voltage so that times of changing on/off states of the segment driving voltages of the plurality of segments are sequentially delayed by a predetermined delay time from a time of changing on/off states of a segment driving voltage applied to a first segment during a quadrant cycle of the segment driving voltage based on a time of the vertical synchronization signal, wherein the on state may indicate a predetermined anode voltage value, off state may indicate a voltage value of 0, and a cycle of the odd and even barrier driving voltages and the segment driving voltages may be equal to the quadruple of the cycle of the vertical synchronization signal.

The second electrode driving voltage controller may control on/off states of the odd and even barrier driving voltages to be repeated in a high frequency based on a time of the vertical synchronization signal by applying the odd and even barrier driving voltage in an impulse form, and the first electrode driving voltage controller may control on/off states of the segment driving voltage to be repeated in a high frequency by applying the segment driving voltage in an impulse form and may control the segment driving voltage so that times of applying a predetermined segment driving voltage in an on state once to each segment are sequentially shifted by a predetermined delay time during one cycle of the segment driving voltage, wherein the on state may indicate a predetermined anode voltage value and the off state may indicate a predetermined cathode voltage value.

According to another exemplary aspect of the invention, there is provided a computer readable recording medium having recorded thereon a program for executing a method of driving a barrier panel for 3D image reproduction, the method including, when the barrier panel includes a first electrode that includes a plurality of segments parallel to each other, a second electrode that includes a plurality of barriers parallel to each other and perpendicular to the plurality of segments, and a liquid crystal disposed between the first and second electrodes: controlling segment driving voltages each being applied to the plurality of segments of the first electrode of the barrier panel, based on a display direction and a cycle of an image signal being displayed on an image display panel for reproducing a 3D image; controlling an odd barrier driving voltage, which is commonly applied to an odd number barriers, and an even barrier driving voltage, which is commonly applied to an even number barriers, from among the plurality of barriers of the second electrode of the barrier panel, based on the display direction; synchronizing the segment driving voltages, the odd barrier driving voltage, and the even barrier driving voltage; and controlling on/off states of each of an absolute value of an odd barrier switching driving voltage as a difference voltage between the odd barrier driving voltage and the segment driving voltage, and an absolute value of an even barrier switching driving voltage as a difference voltage between the even barrier driving voltage and the segment driving voltage for each segment to be maintained for one cycle of the vertical synchronization signal while alternating with each other per cycle of the vertical synchronization signal.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the invention will be described more fully with reference to the accompanying drawings, in which exemplary embodiments of the invention are shown.

Figure 1:
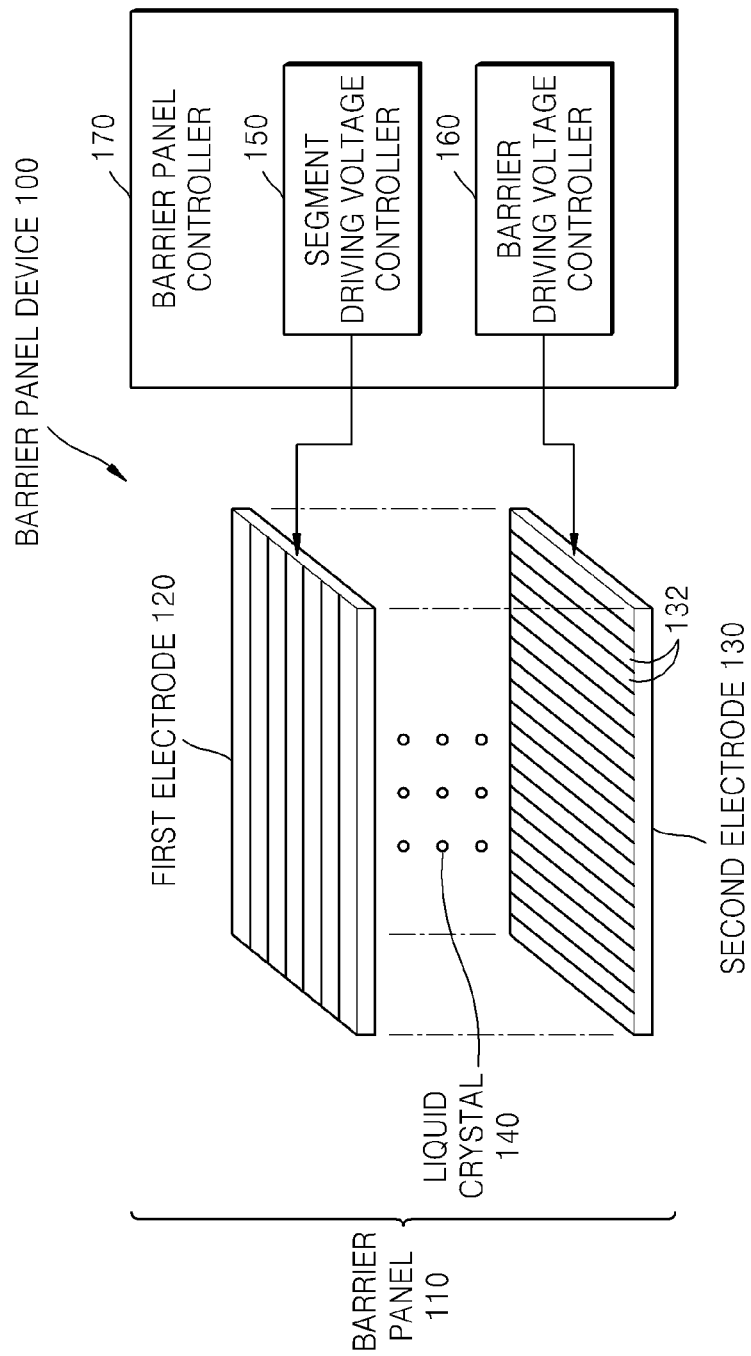
FIG. 1 is a block diagram illustrating a barrier panel device for 3D reproduction according to an exemplary embodiment of the present invention.

FIG. 1 is a block diagram illustrating a barrier panel device 100 for 3D reproduction according to an exemplary embodiment of the invention.

The barrier panel device 100 according to the exemplary embodiment of the invention includes a barrier panel 110 and a barrier panel controller 170. The barrier panel 110 includes a first electrode 120, a second electrode 130, and a liquid crystal 140. The barrier panel controller 170 includes a segment driving voltage controller 150 and a barrier driving voltage controller 160. According to another exemplary embodiment of the invention, the barrier panel device 100 may include the segment driving voltage controller 150 and the barrier driving voltage controller 160 as the external elements of the barrier panel controller 170.

The barrier panel 110 may be a liquid crystal switching panel which controls transmissivity of light passing through the barrier panel 110 by periodically switching the first and second electrodes 120 and 130.

The first electrode 120 includes a plurality of segments 122 that are substantially parallel to each other. The second electrode 130 includes a plurality of barriers 132 that are substantially parallel to each other and substantially perpendicular to the segments. The liquid crystal 140 is disposed between the first and second electrodes 120 and 130 to adjust the transmissivity of the light.

The first electrode 120 may be an upper electrode and the second electrode 130 may be a lower electrode. In the exemplary embodiment of the invention, the first electrode 120 (the upper electrode) includes segments 122 and the second electrode 130 (the lower electrode) includes barriers 132. But the first electrode 120 (the upper electrode) may include barriers 132 and the second electrode 130 (the lower electrode) may include segments 122.

According to an exemplary embodiment of the invention, the segments 122 of the first electrode 120 may be latitudinally divided and the barriers 132 of the second electrode 130 may be longitudinally divided. The segments 122 are latitudinally divided and the barriers 132 are longitudinally divided so that the barrier panel 110 is opened and closed in relation to a display direction of an image when a zigzag method, in which the image is displayed from left to right and from top to bottom on an image display panel, is employed.

The segment driving voltage controller 150 controls segment driving voltages applied to the segments 122 of the first electrode 120. Each segment driving voltage is periodically applied. Specifically, the segment driving voltage controller 150 controls the time instants of changing the on/off states of a segment driving voltage of a predetermined segment 122 to be sequentially delayed from a time instant of changing on/off states of a segment driving voltage of a neighboring segment. Waveforms of the segment driving voltage are described below with reference to FIGS. 5 and 6.

The barrier driving voltage controller 160 controls driving voltages applied to the barriers 132 of the second electrode 130. The barrier driving voltage controller 160 controls first driving voltage or an odd barrier driving voltage commonly applied to odd numbered barriers and a second driving voltage or an even barrier driving voltage commonly applied to even numbered barriers. The on/off states of the odd barrier driving voltage and the even barrier driving voltage may alternate and be periodically repeated. Waveforms of the odd and even barrier driving voltages are described below with reference to FIGS. 5 and 6.

The barrier panel controller 170 controls the barrier driving voltage controller 160 and the segment driving voltage controller 150 so that the on/off states of the barrier panel 110 are periodically alternated based on a combination of the barrier driving voltage and the segment driving voltage applied at the same time.

The barrier panel controller 170 according to an exemplary embodiment of the invention synchronizes the odd barrier driving voltage, the even barrier driving voltage, and the segment driving voltages based on a vertical synchronization signal. The vertical synchronization signal indicates a time instant when one image is started to be displayed on an image display panel. Since images are periodically displayed on the image display panel, the vertical synchronization signal is periodically generated.

A difference voltage between the driving voltages applied to the first electrode 120 and the second electrode 130 is a voltage for driving the barrier panel 110. Accordingly, the barrier panel controller 170 according to an exemplary embodiment of the invention uses a first difference voltage or an odd barrier switching driving voltage between the odd barrier driving voltage and each segment driving voltage and a second difference voltage or an even barrier switching driving voltage between the even barrier driving voltage and each segment driving voltage to drive the barrier panel 110.

The on/off states of absolute values of the odd and even barrier switching driving voltages may be periodically repeated. Accordingly, the on/off states of the absolute value of the odd barrier switching voltage and the absolute value of the even barrier switching driving voltage may be maintained for one cycle of the vertical synchronization signal while alternating with each other per cycle. Waveforms of the odd barrier switching driving voltage and the even barrier switching driving voltage are described below with reference to FIGS. 3 through 7.

Figure 3:
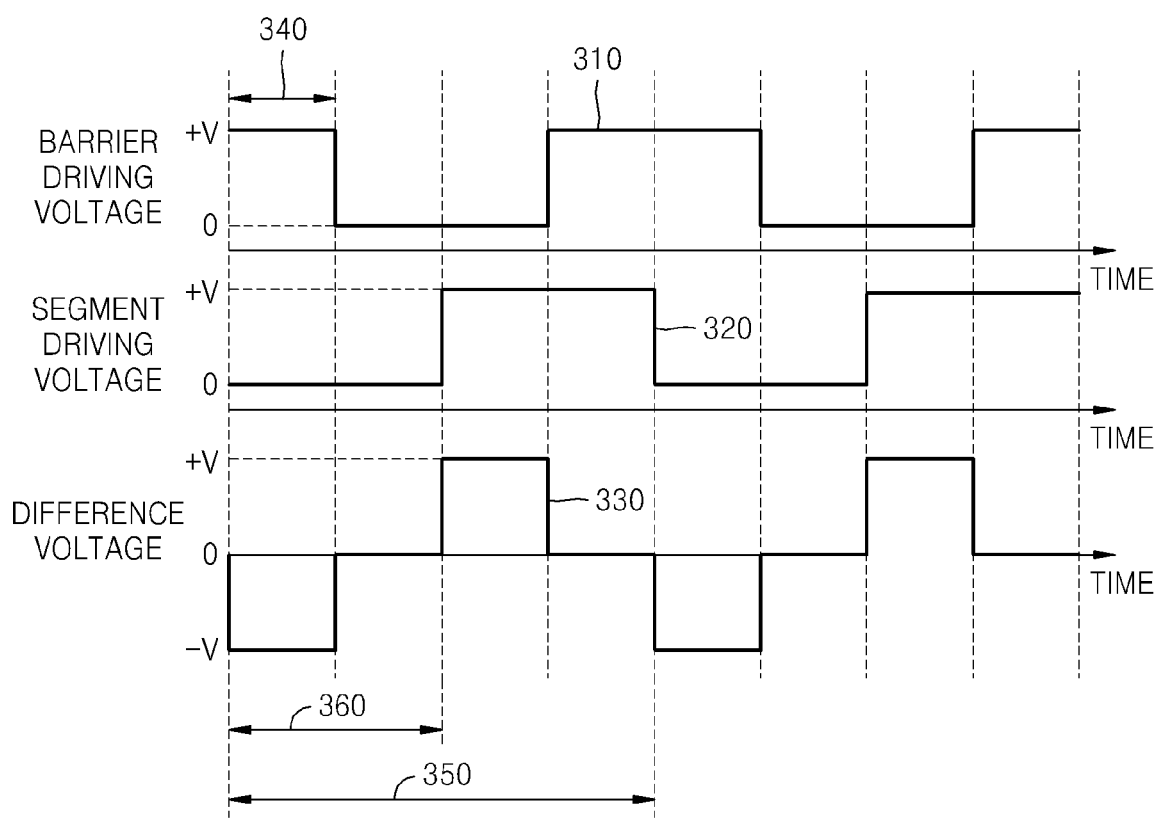
FIG. 3 illustrates a waveform of driving voltages for a barrier panel device.
Figure 4:
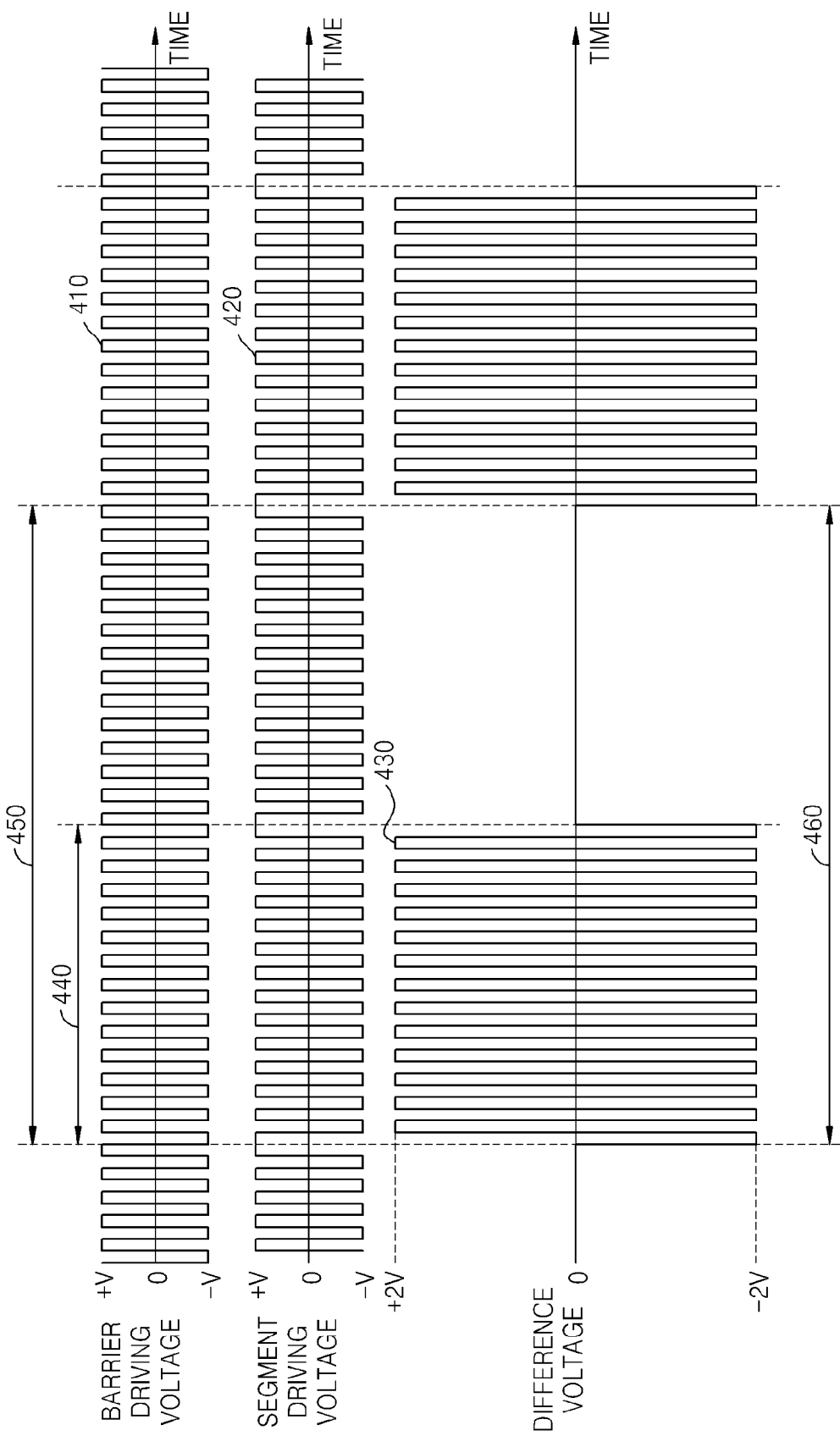
FIG. 4 illustrates another waveform for driving voltages for a barrier panel device.
Figure 5:
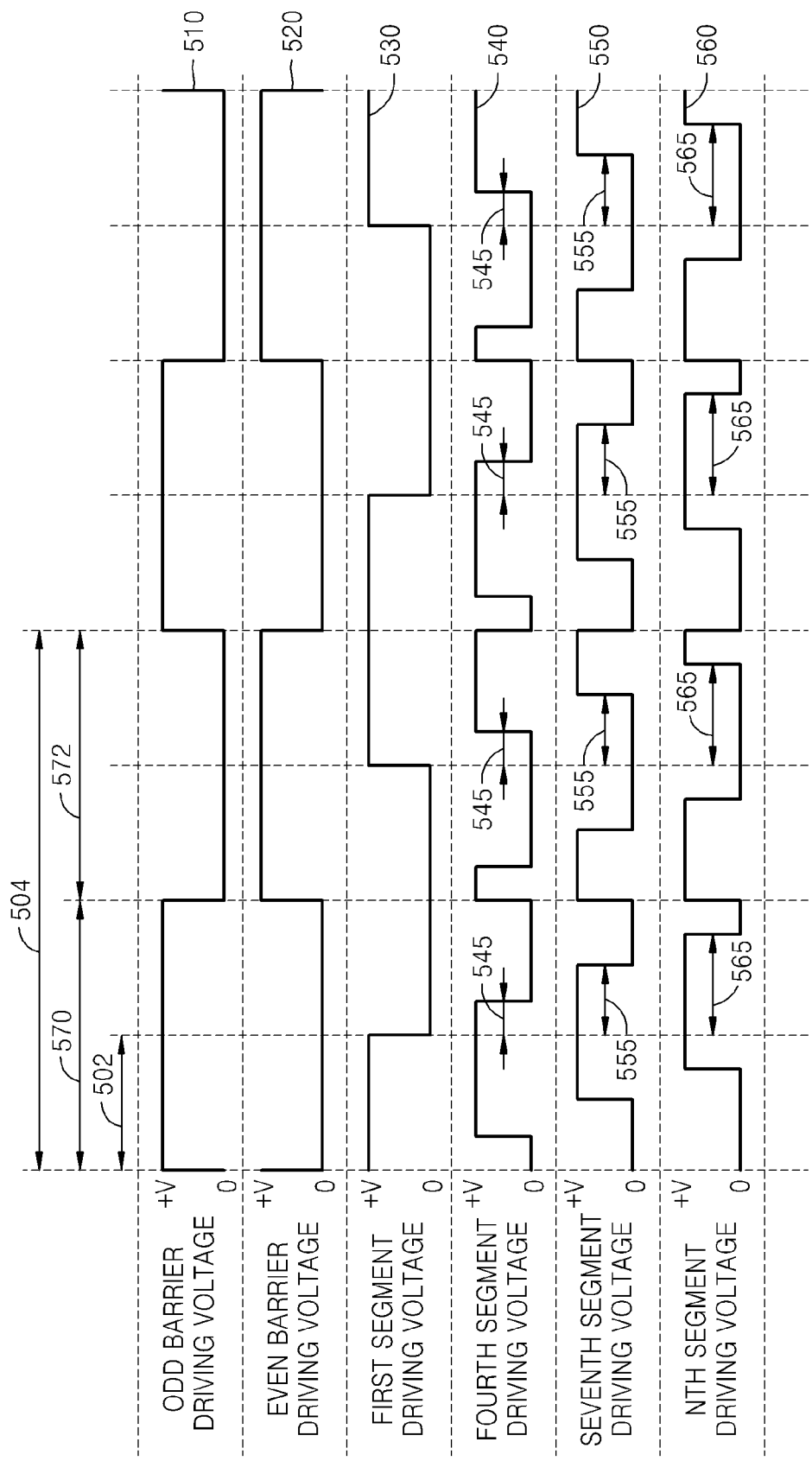
FIG. 5 is a waveform of driving voltages for a barrier panel device according to an exemplary embodiment of the present invention.
Figure 6:
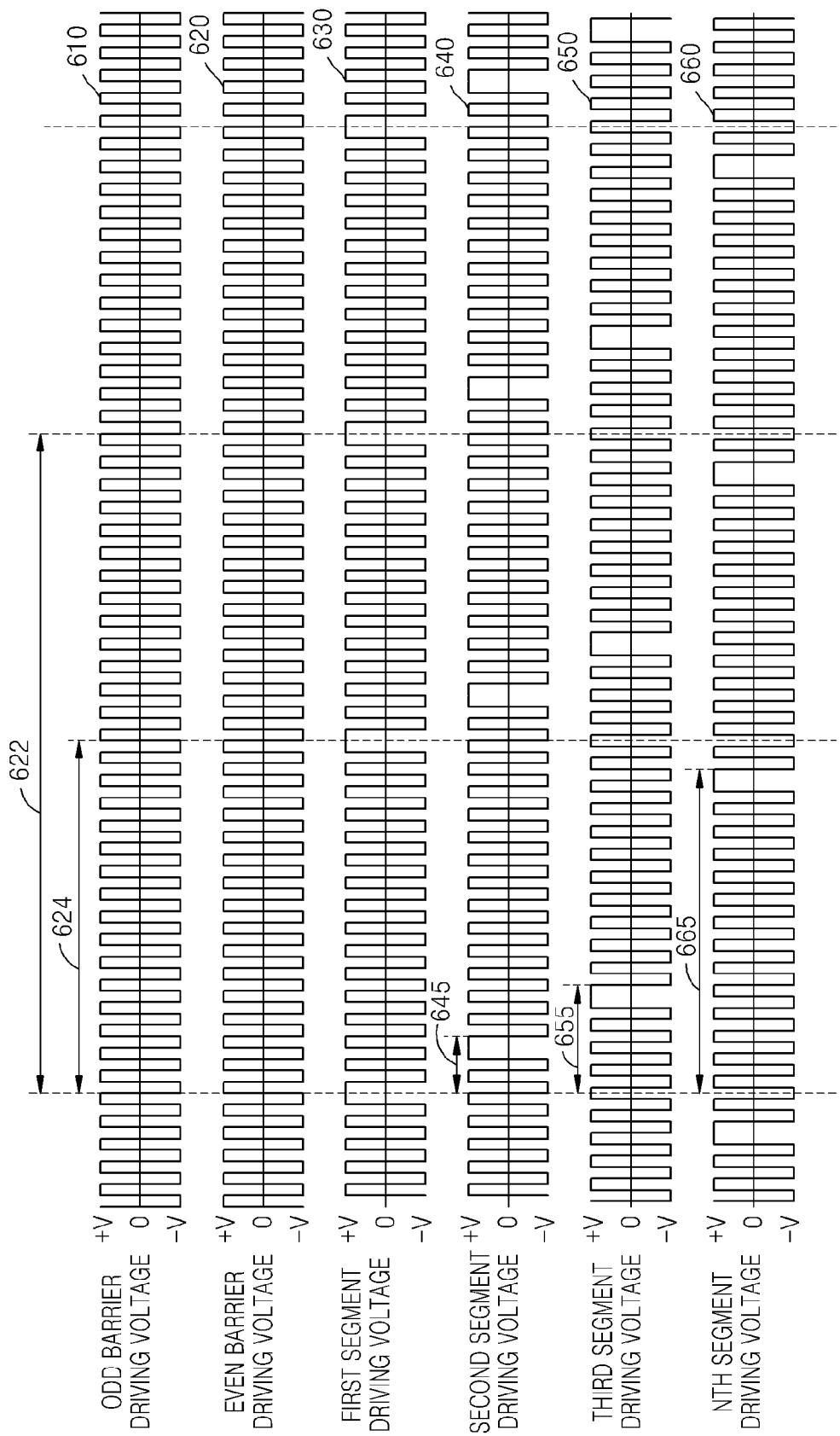
FIG. 6 is another waveform of driving voltages for a barrier panel device according to an exemplary embodiment of the present invention.

The odd barrier driving voltage, the even barrier driving voltage, and the segment driving voltages are periodic signals, wherein (i) the on/off states may be repeated while being continued for a predetermined period (FIGS. 3, 5, and 7) or (ii) a high frequency driving voltage in an impulse form may be repeated (FIGS. 4 and 6). The segment driving voltage controller 150 and the barrier driving voltage controller 160 may control the odd barrier driving voltage, the even barrier driving voltage, and the segment driving voltages to be applied as described in (i) or (ii) above.

Figure 2:
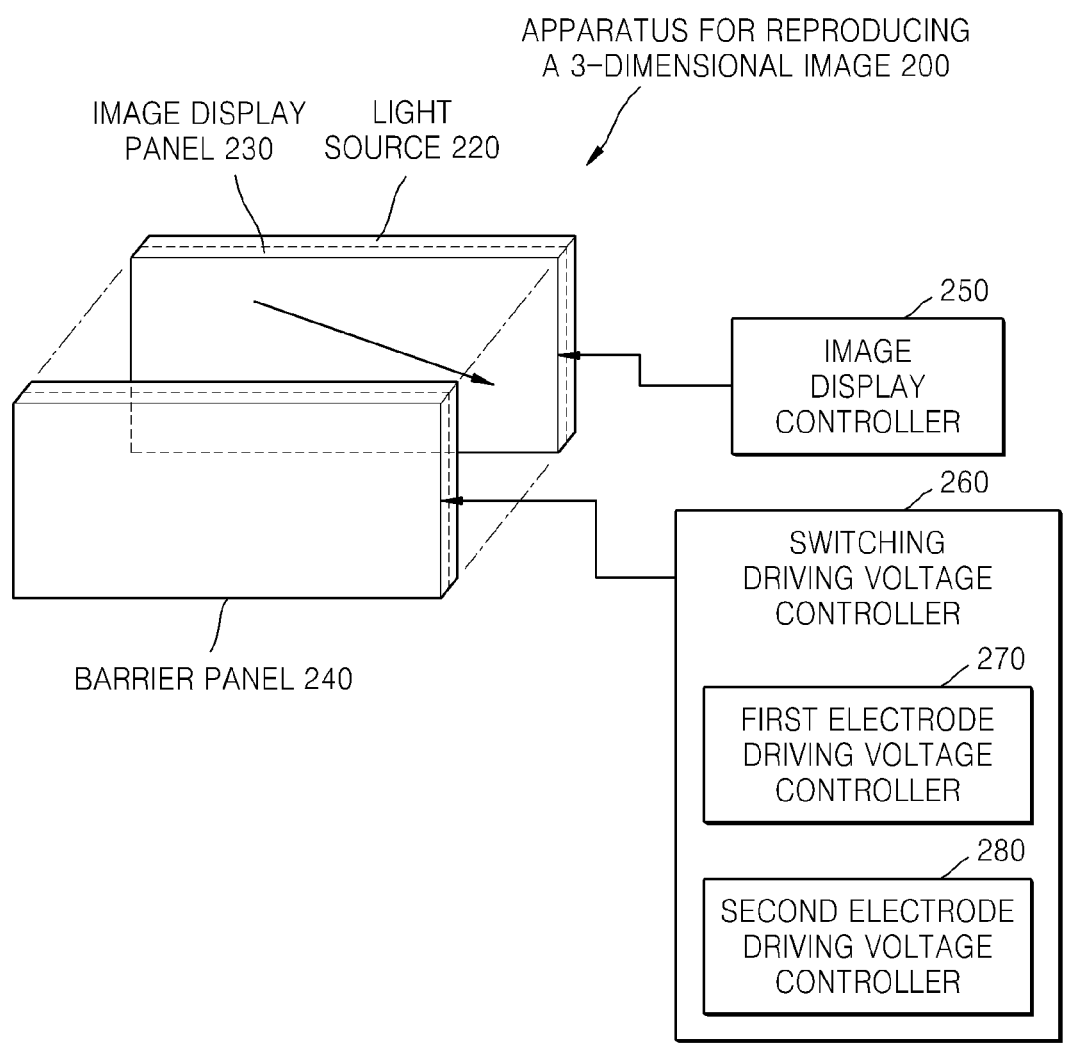
FIG. 2 is a block diagram illustrating an apparatus for reproducing a 3D image, according to an exemplary embodiment of the present invention.

FIG. 2 is a block diagram illustrating an apparatus 200 for reproducing a 3D image, according to an exemplary embodiment of the invention.

The apparatus 200 includes a light source 220, an image display panel 230, a barrier panel 240, an image display controller 250, and a switching driving voltage controller 260.

The light source 220 irradiates light on the image display panel 230 so that an image displayed on the image display panel 230 reaches eyes of a user after passing through the barrier panel 240.

The image display panel 230 displays the image in response to a received image signal. The image display panel 230 according to an exemplary embodiment of the invention is controlled by the image display controller 250 so that the image signal is sequentially moved from left to right and from top to bottom.

The barrier panel 240 includes a first electrode 120 that includes a plurality of segments 122 substantially parallel to each other, a second electrode 130 that includes a plurality of barriers 132 substantially parallel to each other and substantially perpendicular to the segments, and a liquid crystal 140 disposed between the first and second electrodes 120, 130. The switching driving voltage controller 260 controls a driving voltage applied to the first electrode 120 and a driving voltage applied to the second electrode 130.

The image display controller 250 controls the image to be displayed on the image display panel 230 from left to right and from top to bottom, i.e. from top left to bottom right, and displays a new image based on a vertical synchronization signal.

The switching driving voltage controller 260 controls the driving voltage applied to the first and second electrodes 120, 130 based on a display direction and a cycle of the image signal displayed on the image display panel 230. The switching driving voltage controller 260 controls the driving voltages applied to the first and second electrodes based on the display direction and the cycle so that the driving voltages are applied to the segments 122 of the first electrode 120 and the barriers 132 of the second electrode 130, which can irradiate light toward a portion of the image display panel 230 where the image signal is displayed.

Since the on/off states of the driving voltage applied to the barrier panel 240 are periodically repeated, the switching driving voltage controller 260 controls the on/off states based on an absolute value of a difference voltage between the driving voltages of the first and second electrodes 120, 130 to be periodically repeated.

Specifically, the switching driving voltage controller 260 according to an exemplary embodiment of the invention may control the on/off states based on an absolute value of an odd barrier switching driving voltage, being a difference voltage between the odd barrier driving voltage and the segment driving voltage, and an absolute value of an even barrier switching driving voltage, being a difference voltage between the even barrier driving voltage and the segment driving voltage, to be periodically repeated while alternating with each other.

The switching driving voltage controller 260 according to another exemplary embodiment of the invention may synchronize the segment driving voltages and the odd and even barrier driving voltages so that the absolute value of the odd barrier switching driving voltage and the absolute value of the even barrier switching driving voltage are synchronized based on a vertical synchronization signal.

The switching driving voltage controller 260 may include a first electrode driving voltage controller 270 and a second electrode driving voltage controller 280.

The second electrode driving voltage controller controls the on/off states of the odd and even barrier driving voltages to be periodically repeated while alternating with each other.

The first electrode driving voltage controller controls the segment driving voltages to be periodically applied to the segments, and sequentially delays times of changing on/off states of a segment driving voltage applied on a predetermined segment by a time of changing the on/off states of a segment driving voltage applied to a neighboring segment.

Like the barrier panel controller 170 illustrated in FIG. 1, the switching driving voltage controller 260 applies a driving voltage to the barrier panel 240. The first electrode driving voltage controller and the second electrode driving voltage controller each respectively corresponds to the segment driving voltage controller 150 and the barrier driving voltage controller 160 of FIG. 1.

The switching driving voltage controller 260 reproduces a 3D image by controlling images having different viewpoints to be periodically shown to a user, by controlling the first and second electrode driving voltage controllers directly by considering a display direction and a cycle of images displayed on the image display controller 250.

A method used by the switching driving voltage controller 260 to control the driving voltages applied to the segments and the barriers may be the same as the method used by the segment driving voltage controller 150 and the barrier driving voltage controller 160 of FIG. 1 to control the driving voltages, and is described with reference to FIGS. 3 through 7.

FIG. 3 illustrates a waveform of driving voltages for a barrier panel.

As shown, a driving voltage having one form is applied to a barrier electrode, and thus the driving voltage is simultaneously applied to the entire area of the barrier electrode. A barrier driving voltage 310 is maintained at 0V (off state) or +V (on state) for a time period that is twice of a cycle duration 340 of a vertical synchronization signal Vsync. The cycle 350 of the barrier driving voltage 310 is equal to the quadruple of the cycle duration 340.

A segment driving voltage 320 is also maintained at 0V or +V for a time period that is twice the cycle duration 340, and is applied for a cycle equal to the quadruple of the cycle duration 340.

The times of changing 0V and +V of the barrier driving voltage 310 and the segment driving voltage 320 are alternated by the cycle duration 340, so that a difference voltage 330 between the barrier driving voltage 310 and the segment driving voltage 320 has a cycle 360 of the twice of the cycle duration 340 while being maintained at 0 (off state) or +V/−V (on state) for the cycle duration 340.

FIG. 4 illustrates another waveform of driving voltages for a barrier panel.

The driving voltages illustrated in FIG. 4 are high frequency voltages having an impulse form. A barrier driving voltage 410 is a high frequency voltage having an impulse form with values from −V to +V, and has a cycle 450 of the twice of a cycle duration 440 of the vertical synchronization signal Vsync.

A segment driving voltage 420 has an impulse form similar to the barrier driving voltage 410, but is applied in a cycle equal to the cycle duration 440. Since an absolute value of a voltage in an impulse form is +V, an on state is maintained.

The polarity of the barrier driving voltage 410 and the segment driving voltage 420 are opposite so that a difference voltage 430 between the barrier driving voltage 410 and the segment driving voltage 420 is maintained at 0V (off state) or +2V/−2V (on state) for the cycle duration 440 and has a cycle 460 of the double of the cycle duration 440.

When the waveforms illustrated in FIGS. 3 and 4 are applied, the resolution of an image may decrease. A vertical synchronization point of time and an image display time are not synchronized, and thus cross-talk, which is a phenomenon where a right eye image and a left eye image are mixed, may occur.

FIG. 5 illustrates waveforms of driving voltages for a barrier panel according to an exemplary embodiment of the invention.

Similar to the barrier driving voltage 310 and the segment driving voltage 320 of FIG. 3, the barrier driving voltage controller 160 of FIG. 1 or the second electrode driving voltage controller 280 maintains a driving voltage of 0V or +V for 2 cycles of cycle duration 502 of the vertical synchronization signal Vsync, and applies a driving voltage having a voltage cycle 504 equal to 4 cycle durations 502 to a barrier electrode (a second electrode).

The barrier driving voltage controller 160 or the second electrode driving voltage controller 280 controls an odd barrier driving voltage 510 and an even barrier driving voltage 520 so that the odd barrier driving voltage 510 has a value +V and the even barrier driving voltage has a value of 0V during a first half cycle 570 of the voltage cycle 504 equal to 2 cycle durations 502. During a second half cycle 572 of the voltage cycle 504, the odd barrier driving voltage 510 has a value of 0V and the even barrier driving voltage has a value of +V.

The segment driving voltage controller 150 or the first electrode driving voltage controller 270 applies a segment driving voltage having a value +V during a half cycle and a value of 0V during a remaining half cycle, for the duration of voltage cycle 504 similar to the odd barrier driving voltage 510 and the even barrier driving voltage 520.

A first electrode may be divided into first, second, third, . . . , Nth segments. Different segment driving voltages are applied to the respective segments based on a display direction and a cycle of an image displayed on an image display panel from top to bottom. Accordingly, values of a difference voltage between the barrier driving voltage and the segment driving voltages have a value of 0V for a half cycle of the voltage cycle 504 for 2 cycle durations 502 and +V value during a remaining half cycle. Times of changing on/off states based on the locations of the segments are sequentially delayed based on a display direction and a cycle of an image.

The barrier electrodes according to an exemplary embodiment of the invention are operated according to odd numbered barriers and even numbered barriers. The value of 0 or +V of each absolute value of the first difference voltage between the odd barrier driving voltage 510 and first, fourth, seventh, . . . , Nth segment driving voltages 530, 540, 550, 560, and each absolute value of the second difference voltage between the even barrier driving voltage 520 and the segment driving voltages 530, 540, 550, 560 are alternated with each other. The times of changing on/off states according to the locations of the segments are sequentially delayed based on the display direction and the cycle of the image.

The segment driving voltage controller 150 or the first electrode driving voltage controller 270 according to an exemplary embodiment of the invention control the first segment driving voltage 530, the fourth segment driving voltage 540, the seventh segment driving voltage 550, and the Nth segment driving voltage 560 to be applied to a corresponding segment.

One cycle of the segment driving voltages 530, 540, 550, and 560 is equal to the voltage cycle 504 or to 4 cycle durations 502. During one cycle, the total sections of an on state (+V) and an off state (0) is each equal to 2 cycle durations 502.

Differences between the segment driving voltages 530, 540, 550, and 560 appear in delay times. A delay time between the segment driving voltages 530, 540, 550, and 560 recursively occurs during each quarter of the voltage cycle 504. A time of changing on/off states of the fourth segment driving voltage 540 is delayed by a delay time 545 as compared to the first segment driving voltage 530. A time of changing on/off states of the seventh segment driving voltage 550 is delayed by a delay time 555 as compared to the first segment driving voltage 530. A time of changing on/off states of the Nth segment driving voltage 560 is delayed by a delay time 565 as compared to the first segment driving voltage 530.

Accordingly, the values of 0 or +V of the absolute values of the difference voltages between the odd and even barrier driving voltages 510 and 520 and the segment driving voltages 530, 540, 550, and 560 may be sequentially delayed based on the locations of the segments while alternating with each other.

FIG. 6 illustrates another waveform of driving voltages for a barrier panel, according to an exemplary embodiment of the invention.

Similar to the barrier driving voltage 410 and the segment driving voltage 420 of FIG. 4, the barrier driving voltage controller 160 or the second electrode driving voltage controller 280 according to the exemplary embodiment controls an odd barrier driving voltage 610 and an even barrier driving voltage 620 each having a cycle 622 equal to 2 cycle durations 624 of the vertical synchronization signal Vsync. The odd barrier driving voltage 610 and the even barrier driving voltage 620 are controlled so that the even barrier driving voltage 620 having a value −V (+V) is applied while the odd barrier driving voltage 610 having a value opposite of +V (−V) is applied.

The segment driving voltage controller 150 or the first electrode driving voltage controller 270 controls first, second, third, . . . , Nth segment driving voltages 630, 640, 650, and 660 to be applied to a corresponding segment in a high frequency and in an impulse form having a value ±V, similarly to the odd barrier driving voltage 610 and the even barrier driving voltage 620.

The delay times of each segment driving voltage 630, 640, 650, and 660 recursively occurs for one cycle of the cycle duration 624. The delay time of each segment driving voltage 630, 640, 650, and 660 is a delay time of applying a predetermined signal, in which a +V voltage is maintained twice longer than an impulse signal. A time of applying the predetermined signal in the second segment driving voltage 640 is delayed by a delay time 645 as compared to the first segment driving voltage 630. A time of applying the predetermined signal in the third segment driving voltage 650 is delayed by a delay time 655. A time of applying the predetermined signal in the Nth segment driving voltage 660 is delayed by a delay time 665 as compared to the first segment driving voltage 630.

Figure 7:
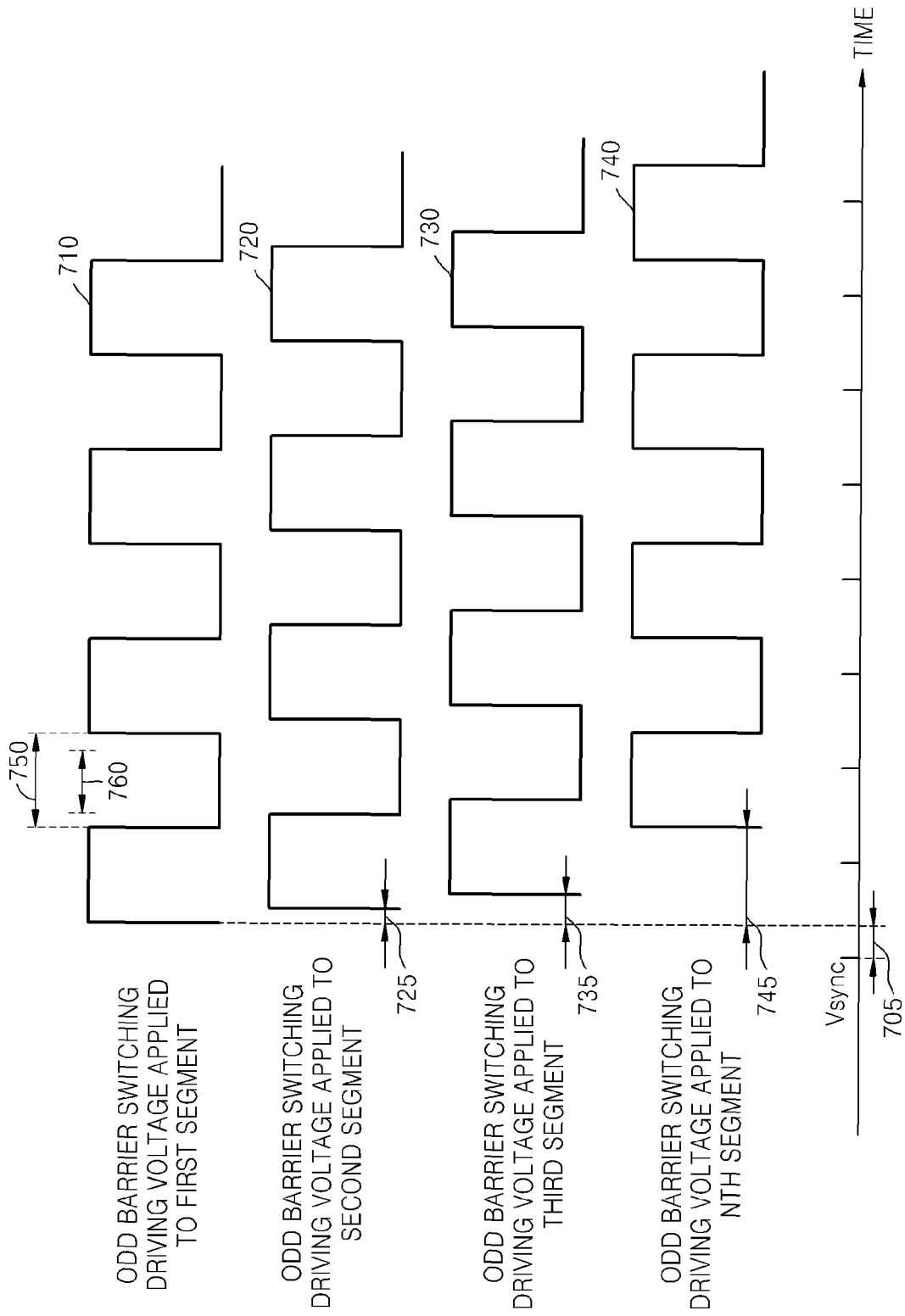
FIG. 7 is a diagram illustrating difference voltages between driving voltages applied to a barrier panel device and delay times of segment driving voltages according to an exemplary embodiment of the present invention.

FIG. 7 is a diagram illustrating difference voltages of driving voltages applied to a barrier panel and delay times of segment driving voltages, according to an exemplary embodiment of the invention.

A switching operation of a barrier panel is performed by a difference voltage between driving voltages applied to a first electrode and a second electrode. Odd barrier switching driving voltages 710, 720, 730, and 740 illustrated in FIG. 7 represent waveforms of absolute values of difference voltages between the odd barrier driving voltage and each segment driving voltage. The on/off states of the driving voltages illustrated on FIG. 7 are maintained for a predetermined time as described with reference to FIGS. 3 and 5.

When the odd barrier switching driving voltages 710, 720, 730, and 740 are in the on states, the odd numbered barriers are opened and the even numbered barriers are closed. When the odd barrier switching driving voltages 710, 720, 730, and 740 are in the off states, the even numbered barriers are opened and the odd numbered barriers are closed.

A time when each odd or even numbered barrier is opened corresponds to a cycle of a vertical synchronization signal Vsync with a cycle period 750. A time 760 of displaying an actual image $D_E$ corresponds to a time when the odd or even numbered barriers are opened.

The times of changing on/off states of the odd barrier switching driving voltages 710, 720, 730, and 740 for each segment are uniformly delayed based on a time of a vertical synchronization signal $V_{sync}$. For example, the time of changing the on/off states of the odd barrier driving voltage 710 applied to the first segment is delayed by a delay time 705 from the $V_{sync}$.

The odd barrier driving voltages 710, 720, 730, and 740 are uniformly delayed between each segment. The time of the changing on/off states of the odd barrier switching driving voltages 720, 730, and 740 applied to second, third, Nth segments are respectively delayed by second, third, and Nth delay times 725, 735, and 745 as compared to the odd barrier switching driving voltage 710.

The second, third, and Nth delay times 725, 735, and 745 as compared to the cycle of the odd barrier switching driving voltage 710 are in proportion to the sequence of each segments and the time 760 of displaying the image $D_E$. The Nth delay time 745 of the odd barrier switching driving voltage 740 is obtained as:

$$N\text{th delay time} = (N-1)D_E/N \qquad (1)$$

Accordingly, the second and third delay times 725 and 735 each is respectively equal to $D_E/N$ and $2D_E/N$. In FIG. 7, only the absolute values of the odd barrier switching driving voltages 710, 720, 730, and 740 are illustrated, and thus the delay times are described based on the odd numbered barriers. The on/off states based on the absolute values of the even barrier switching driving voltages of each segment are the opposite of the on/off states of the absolute values of the odd barrier switching driving voltages 710, 720, 730, and 740.

As described above, the segment driving voltage controller 150 or the first electrode driving voltage controller 270 controls the waveforms of the segment driving voltages and synchronization of the segment driving voltages with respect to the vertical synchronization signal.

According to another exemplary embodiment of the invention, the segment driving voltage controller 150 and the first electrode driving voltage controller 270 controls the waveforms of the segment driving voltages. The barrier panel controller 170 or the switching driving voltage controller 260 controls synchronization of the segment driving voltages and odd/even barrier driving voltages, and synchronization with respect to the vertical synchronization signal.

Because the driving voltages of a barrier panel are controlled as described in exemplary embodiments of the invention, a user may view an accurate 3D image in consideration of the cycle and display direction of the image displayed on the image display panel, and cycles of images having different viewpoints being displayed on the image display panel. The time instants when driving voltages are applied according to a sequence of segments are controlled. The time differences among the time instants when the driving voltages are applied to odd number barriers and even number barriers are also controlled.

Figure 8:
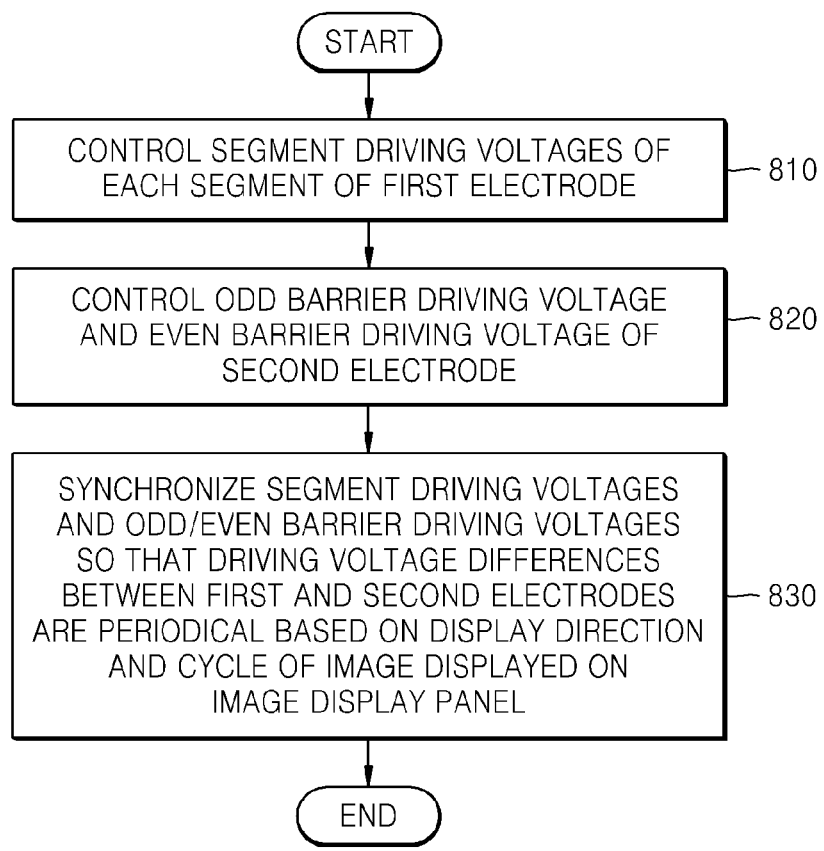
FIG. 8 is a flowchart of a method of driving a barrier panel device for 3D image reproduction according to an exemplary embodiment of the present invention.

FIG. 8 is a flowchart of a method of driving a barrier panel for 3D image reproduction, according to an exemplary embodiment of the invention.

In operation 810, segment driving voltages of each segment of a first electrode (a second electrode) are controlled. In operation 820, an odd barrier driving voltage and an even barrier driving voltage of the second electrode (the first electrode) is each controlled.

Operations 810 and 820 may be performed simultaneously based on a sequence and a cycle of images displayed on the image display panel. The odd and even barrier driving voltages have opposite waveforms and are periodically repeated. The segment driving voltages of each segment are sequentially applied based on locations of the segments. The delay times of the driving voltages of segments based on a first segment are in proportion to the sequence of the segments and a cycle of an actual image displayed.

In operation 830, the segment driving voltages and odd/even barrier driving voltages are synchronized so that driving voltages differences between the first and second electrodes are periodic based on a display direction and the cycle of the image displayed on the image display panel.

For example, a left eye image (or a right eye image) of one frame is displayed from an upper line to a bottom line on the image display panel, and from left to right in one line. After the left eye image (or the right eye image) of one frame is displayed, a right eye image (or a left eye image) is continuously displayed in the same direction and order.

The segment driving voltages may be controlled to be sequentially applied from the top segments to the bottom segments so that the segments corresponding to the top line of the left eye or right eye image are operated first. The odd and even barrier driving voltages may be controlled in such a way that the odd number barriers corresponding to the left eye (or the right eye) and the even number barriers corresponding to the right eye (or the left eye) are alternatively opened.

The segment driving voltages and odd and even barrier driving voltages are synchronized based on a vertical synchronization signal indicating a point of time when the image is displayed on the image display panel so that the segments and barriers are simultaneously and sequentially opened and closed. Accordingly, the right eye image is formed for the right eye and the left eye image is formed for the left eye without cross-talk, and thus eye fatigue is reduced.

Exemplary embodiments of the invention can be written as computer programs and can be implemented in general-use digital computers that execute the programs using a computer readable recording medium. Examples of the computer-readable recording and storage medium include magnetic storage media (e.g., ROM, floppy disks, hard disks, etc.), optical recording media (e.g., CD-ROMs, or DVDs).

The exemplary embodiments may also be embodied as computer-readable codes or instructions on a transmission medium. Examples of the transmission medium include carrier waves and other data transmission devices which can carry data over the internet.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A barrier panel device for 3D image reproduction, the barrier panel device comprising:
   a barrier panel, which comprises:
      a first electrode comprising a plurality of segments arranged substantially parallel and adjacent to each other,
      a second electrode comprising a plurality of barriers arranged substantially parallel to each other and substantially perpendicular to the plurality of segments, wherein the plurality of barriers comprises odd barriers and even barriers arranged between adjacent ones of the odd barriers, and
      a liquid crystal disposed between the first electrode and the second electrode;
   a segment driving voltage controller, which controls on/off states of segment driving voltages applied to the plurality of segments; and
   a barrier driving voltage controller, which alternatively and repeatedly applies a barrier driving voltage to the odd barriers, while applying 0V to the even barriers, and applies the barrier driving voltage to the even barriers, while applying 0V to the odd barriers, wherein the on/off states of the segment driving voltages alternate while the on/off states of the barrier driving voltages alternate, and
   the segment driving voltage controller controls each segment driving voltage to be periodically applied to a corresponding segment, controls a time of changing the on state of the segment driving voltage of predetermined segments to be sequentially delayed from a time of changing the on state of a segment driving voltage of a corresponding adjacent neighboring segment, and controls a time of changing the off state of the segment driving voltage of the predetermined segments to be sequentially delayed from a time of changing the off state of the segment driving voltage of the corresponding adjacent neighboring segment.

2. The barrier panel device of claim 1, wherein the barrier driving voltage controller controls:
   an odd barrier driving voltage, which is commonly applied to the odd barriers, and an even barrier driving voltage, which is commonly applied to the even barriers, and
   on/off states of the odd and even barrier driving voltages to be periodically repeated while alternating with each other.

3. The barrier panel device of claim 2, wherein the barrier driving voltage controller controls the odd and even barrier driving voltages so that the odd barrier driving voltage is in the on state and the even barrier driving voltage is in the off state during a first half cycle of a cycle of the odd and even barrier driving voltages, and
   the odd barrier driving voltage is in the off state and the even barrier driving voltage is in the on state during a second half cycle of the cycle of the odd and even barrier driving voltages, wherein the on state indicates a predetermined anode voltage value and the off state indicates a voltage value of 0V.

4. The barrier panel device of claim 2, wherein the barrier driving voltage controller controls:
   the odd and even barrier driving voltages so that the on/off states are repeated in a high frequency by applying the odd and even barrier driving voltages in a pulse form, wherein the on state indicates a predetermined anode voltage value and the off state indicates a predetermined cathode voltage value.

5. The barrier panel device of claim 2, wherein the odd barrier driving voltage, the even barrier driving voltage, and the segment driving voltages are synchronized based on a vertical synchronization signal, the device further comprising:
   a barrier panel controller, which controls the on/off states of the odd barrier driving voltage, the even barrier driving voltage, and the segment driving voltages based on an absolute value of an odd barrier switching driving voltage, being a difference voltage between the odd barrier driving voltage and the segment driving voltage, and an absolute value of an even barrier switching driving voltage, being a difference voltage between the even barrier driving voltage and the segment driving voltage, for each segment to be maintained for one cycle of the vertical synchronization signal while alternating with each other per the vertical synchronization signal cycle.

6. The barrier panel device of claim 1, wherein the segment driving voltage controller controls:
   each segment driving voltage so that the on/off states of the each segment driving voltage have opposite waveforms during a first half cycle and during a second half cycle of a segment driving voltage cycle, and
   the segment driving voltage applied to the plurality of the segments so that times of changing the on/off states of the segment driving voltage of predetermined segments are sequentially delayed by a predetermined delay time from a time of changing the on/off states of the segment driving voltage applied to a first segment during the segment driving voltage cycle, wherein the on state indicates a predetermined anode voltage value and the off state indicates a voltage value of 0V.

7. The barrier panel device of claim 1, wherein the segment driving voltage controller controls:
   the on/off states of the segment driving voltage to be repeated in a high frequency by applying the segment driving voltage in a pulse form, and
   the segment driving voltage so that times of applying a predetermined segment driving voltage in the on state once to each segment are sequentially shifted by a predetermined delay time during a half cycle of the segment driving voltage, wherein the on state indicates a predetermined anode voltage value and the off state indicates a predetermined cathode voltage value.

8. The barrier panel device of claim 7, wherein the segment driving voltage controller determines a predetermined delay time of a predetermined segment to be proportional to a time of displaying an actual image for the 3 D image reproduction and a sequence number of the predetermined segment.

9. A method of driving a barrier panel device for reproducing a 3D image, the method comprising:
   controlling on/off states of segment driving voltages each being applied to a plurality of segments of a first electrode of a barrier panel, based on a display direction and a cycle of an image signal being displayed on an image display panel for reproducing the 3D image, wherein the plurality of segments is arranged substantially parallel and adjacent to each other;
   controlling on/off states of an odd barrier driving voltage, which is commonly applied to odd numbered barriers, and on/off states of an even barrier driving voltage, which is commonly applied to even numbered barriers of a second electrode of the barrier panel which are disposed between adjacent ones of the odd numbered barriers, based on the display direction, wherein the odd barrier driving voltage is applied to the odd numbered barriers, while 0V is applied to the even numbered barriers, and the even barrier driving voltage is applied to the even numbered barriers, while 0V is applied to the odd numbered barriers, alternatively and repeatedly, wherein the even and odd numbered barriers are substantially parallel to each other and perpendicular to the segments; and synchronizing the segment driving voltages, the odd barrier driving voltage, and the even barrier driving voltage, wherein the barrier panel includes a liquid crystal disposed between the first electrode and the second electrode, the on/off states of the segment driving voltages alternate while the on/off states of the odd barrier driving voltage alternate and the on/off states of the even barrier driving voltage alternate, and the controlling the segment driving voltages comprises:
controlling each segment driving voltage to be periodically applied; and
controlling the segment driving voltages so that times of changing the on state of the segment driving voltage of predetermined segments is sequentially delayed from a time of changing the on state of the segment driving voltage of a corresponding adjacent neighboring segment, and the times of changing the off state of the segment driving voltage of the predetermined segments is sequentially delayed from a time of changing the off state of the segment driving voltage of the corresponding adjacent neighboring segment.

10. The method of claim 9, wherein the controlling the odd and even barrier driving voltages further comprises:
maintaining the odd barrier driving voltage in the on state and the even barrier driving voltage in the off state during a first half cycle of an odd and even barrier driving voltages cycle; and
maintaining the odd barrier driving voltage in the off state and the even barrier driving voltage in the on state during a second half cycle of the odd and even barrier driving voltages cycle,
wherein the on state indicates a predetermined anode voltage value and the off state indicates a voltage value of 0V.

11. The method of claim 10, wherein the controlling the odd and even barrier driving voltages further comprises:
controlling the cycle of the odd and even barrier driving voltages to be a quadruple of a vertical synchronization signal cycle; and
synchronizing the odd and even barrier driving voltages based on the vertical synchronization signal.

12. The method of claim 9, wherein the controlling the odd and even barrier driving voltages comprises:
controlling the on/off states of the odd and even barrier driving voltages to repeat while alternating with each other in a high frequency based on a vertical synchronization signal, by applying the odd and even barrier driving voltages in an impulse form, wherein the on state indicates a predetermined anode voltage value and the off state indicates a predetermined cathode voltage value.

13. The method of claim 9, wherein:
the controlling each segment driving voltage to be periodically applied comprises controlling the on/off states of the segment driving voltage applied to a predetermined segment to have opposite waveforms during a first half cycle and a second half cycle of a segment driving voltage cycle, and
the controlling the segment driving voltages so that times of changing the on/off states of a segment driving voltage of a predetermined segment are sequentially delayed from a time of changing the on/off states of a segment driving voltage of a neighboring segment comprises controlling the segment driving voltage applied to the plurality of the segments so that times of changing the on/off states of the segment driving voltage are sequentially delayed by a predetermined delay time from a time of changing the on/off states of the segment driving voltage applied to a first segment during the segment driving voltage cycle, and
wherein the on state indicates a predetermined anode voltage value and the off state indicates a voltage value of 0V.

14. The method of claim 13, wherein:
the controlling each segment driving voltage to be periodically applied further comprises controlling the segment driving voltage cycle to be equal to a quadruple of a vertical synchronization signal cycle, and
the controlling the segment driving voltages so that times of changing the on/off states of a segment driving voltage of a predetermined segment are sequentially delayed from a time of changing the on/off states of a segment driving voltage of a neighboring segment further comprises synchronizing each segment driving voltage based on a vertical synchronization signal.

15. The method of claim 9, wherein:
the controlling each segment driving voltage to be periodically applied comprises controlling the on/off states of the segment driving voltage to be repeated in a high frequency by applying the segment driving voltage in an impulse form, and
the controlling the segment driving voltages so that times of changing the on/off states of a segment driving voltage of a predetermined segment are sequentially delayed from a time of changing the on/off states of a segment driving voltage of a neighboring segment comprises controlling the segment driving voltage so that times of applying a predetermined segment driving voltage in an on state once to each segment are sequentially shifted by a predetermined delay time during a segment driving voltage cycle, and
wherein the on state indicates a predetermined anode voltage value and the off state indicates a predetermined cathode voltage value.

16. The method of claim 15, wherein the controlling each segment driving voltage to be periodically applied further comprises controlling the segment driving voltage cycle to be equal to two vertical synchronization signal cycles, and
the controlling the segment driving voltages so that times of changing the on/off states of a segment driving voltage of a predetermined segment are sequentially delayed from a time of changing the on/off states of a segment driving voltage of a neighboring segment further comprises synchronizing each segment driving voltage based on the vertical synchronization signal.

17. The method of claim 9, wherein the synchronizing the segment driving voltages comprises synchronizing the odd barrier driving voltage, the even barrier driving voltage, and the segment driving voltages based on a vertical synchronization signal, the method further comprising:
controlling the on/off states of the odd barrier driving voltage, the even barrier driving voltage, and the segment driving voltages based on an absolute value of an odd barrier switching driving voltage, being a difference voltage between the odd barrier driving voltage and the segment driving voltage, and an absolute value of an even barrier switching driving voltage, being a difference voltage between the even barrier driving voltage and the segment driving voltage, for each segment to be maintained for one cycle of the vertical synchronization signal while alternating with each other per the vertical synchronization signal cycle.

18. An apparatus for reproducing a 3D image, the apparatus comprising:
a light source;
an image display panel for displaying an image signal;
a barrier panel comprising:
a first electrode which comprises a plurality of segments arranged substantially parallel and adjacent to each other,
a second electrode which comprises a plurality of barriers substantially parallel to each other and substantially perpendicular to the segments, wherein the plurality of barriers comprises odd barriers and even barriers arranged between adjacent ones of the odd barriers, and
a liquid crystal which is disposed between the first electrode and second electrode; and
a switching driving voltage controller which controls on/off states of driving voltages applied to the first and second electrodes based on a display direction and a cycle of the displayed image signal,
wherein the on/off states of the driving voltages applied to the first electrode alternate while the on/off states of the driving voltages applied to the second electrode alternate, and
the switching driving voltage controller comprises:
a first electrode driving voltage controller, which controls segment driving voltages to be applied to the plurality of segments, for each segment driving voltage to be periodically applied to a corresponding segment, and controls times of changing an on state of the segment driving voltage of predetermined segments to be sequentially delayed from a time of changing the on state of a segment driving voltage of a corresponding adjacent neighboring segment, and controls times of changing the off state of the segment driving voltage of the predetermined segments to be sequentially delayed from a time of changing the off state of the segment driving voltage of the corresponding adjacent neighboring segment; and
a second electrode driving voltage controller which, alternatively and repeatedly, applies a barrier driving voltage to the odd barriers, while applying 0V to the even barriers, and applies the barrier driving voltage to the even barriers, while applying 0V to the odd barriers.

19. The apparatus of claim 18, wherein the switching driving voltage controller:
controls the on/off states of the driving voltages applied to the first and second electrodes based on an absolute value of an odd barrier switching driving voltage, being a difference voltage between an odd barrier driving voltage commonly applied to odd number barriers of the plurality of barriers and the segment driving voltage applied to the plurality of segments, and an absolute value of an even barrier switching driving voltage, being a difference voltage between an even barrier driving voltage commonly applied to even number barriers of the plurality of barriers and the segment driving voltage, to be maintained for one cycle of a vertical synchronization signal while alternating with each other per the vertical synchronization signal cycle, and
synchronizes the odd barrier driving voltage, the even barrier driving voltage, and the segment driving voltage based on the vertical synchronization signal.

20. A non-transitory computer-readable recording medium having recorded thereon a program, which program, when executed by a computer, causes the computer to execute a method of driving a barrier panel for 3D image reproduction, the method comprising:
controlling on/off states of segment driving voltages each being applied to corresponding segments of a first electrode of a barrier panel based on a display direction and a cycle of an image signal being displayed on an image display panel which reproduces a 3D image, the segments being arranged substantially parallel and adjacent to one another;
controlling on/off states of an odd barrier driving voltage, which is commonly applied to odd numbered barriers, and on/off states of an even barrier driving voltage, which is commonly applied to even numbered barriers based on the display direction, the odd and even numbered barriers being disposed at a second electrode of the barrier panel substantially parallel to one another and substantially perpendicular to the segments, wherein the even numbered barriers are arranged between adjacent ones of the odd numbered barriers, and the odd barrier driving voltage is applied to the odd numbered barriers, while 0V is applied to the even numbered barriers, and the even barrier driving voltage is applied to the even numbered barriers, while 0V is applied to the odd numbered barriers, alternatively and repeatedly;
synchronizing the segment driving voltages, the odd barrier driving voltage, and the even barrier driving voltage; and
controlling the on/off states of the odd barrier driving voltage, the even barrier driving voltage, and the segment driving voltages based on an absolute value of an odd barrier switching driving voltage, being a difference voltage between the odd barrier driving voltage and the segment driving voltage, and an absolute value of an even barrier switching driving voltage, being a difference voltage between the even barrier driving voltage and the segment driving voltage, for each segment to be maintained for one cycle of the vertical synchronization signal while alternating with each other per the vertical synchronization signal cycle,
wherein the barrier panel includes a liquid crystal disposed between the first electrode and the second electrode,
the on/off states of the segment driving voltages alternate while the on/off states of the odd barrier driving voltage alternate and the on/off states of the even barrier driving voltage alternate, and
the controlling the segment driving voltages comprises:
controlling each segment driving voltage to be periodically applied, and
controlling the segment driving voltages so that times of changing the on state of the segment driving voltage of predetermined segments is sequentially delayed from a time of changing the on state of the segment driving voltage of a corresponding adjacent neighboring segment, and the times of changing the off state of the segment driving voltage of the predetermined segments is sequentially delayed from a time of changing the off state of the segment driving voltage of the corresponding adjacent neighboring segment.

* * * * *